US011494726B2

(12) United States Patent
Marrale

(10) Patent No.: US 11,494,726 B2
(45) Date of Patent: Nov. 8, 2022

(54) PROCESS OF COMBINING MULTIPLE CARRIERS FOR INTERNATIONAL SHIPPING

(71) Applicant: ExFreight Zeta, LLC, Lake Worth, FL (US)

(72) Inventor: Charles Marrale, Lake Worth, FL (US)

(73) Assignee: ExFreight Zeta, LLC, Lake Worth, FL (US)

(*) Notice: Subject to any disclaimer, the term of this patent is extended or adjusted under 35 U.S.C. 154(b) by 571 days.

(21) Appl. No.: 16/114,529

(22) Filed: Aug. 28, 2018

(65) Prior Publication Data
US 2019/0005444 A1     Jan. 3, 2019

Related U.S. Application Data

(63) Continuation-in-part of application No. 14/309,147, filed on Jun. 19, 2014, now abandoned.
(Continued)

(51) Int. Cl.
*G06Q 10/08* (2012.01)
*G06Q 50/28* (2012.01)

(52) U.S. Cl.
CPC ..... *G06Q 10/0831* (2013.01); *G06Q 10/0834* (2013.01); *G06Q 10/08345* (2013.01); *G06Q 50/28* (2013.01)

(58) Field of Classification Search
CPC .......... G06Q 10/0831; G06Q 10/0834; G06Q 10/08345
(Continued)

(56) References Cited

U.S. PATENT DOCUMENTS 5,122,959 A    6/1992  Nathanson et al.
5,157,714 A   10/1992  Spicer
(Continued)

FOREIGN PATENT DOCUMENTS

WO    WO2000068859 A2    11/2000
WO    WO0203221          1/2002
WO    WO-0203221 A2 *    1/2002  ............. G06Q 10/08

OTHER PUBLICATIONS

D. liu, S. Zhao and J. Liu, "The impact of value of time on mode choice of freight intermodal transport," 2012 IEEE International Conference on Management of Innovation & Technology (ICMIT), 2012, pp. 179-184. (Year: 2012).*
(Continued)

*Primary Examiner* — Jeff Zimmerman
*Assistant Examiner* — Hunter A Molnar
(74) *Attorney, Agent, or Firm* — McHale & Slavin, P.A.

(57) ABSTRACT

Disclosed is a method process of online rating for international import and export shipments. The rating combines multiple carriers together in order to provide one cohesive international service. The consumer can obtain a door to port or door to door rate when employing a pick up carrier, such as a trucking company, and an airline or ocean carrier as well as a destination delivery company. The method provide a real time monetary rate costs based upon the closest terminal and determines which terminal to terminal rate to use for the air or ocean portion as well as providing a pick up rate for that service. The process further estimates the multiple ocean and air rate costs from various vendors associated with a shipment and stores these rate costs through a database to be used at a later date for verification.

16 Claims, 22 Drawing Sheets
(16 of 22 Drawing Sheet(s) Filed in Color)

Related U.S. Application Data

(60) Provisional application No. 61/836,809, filed on Jun. 19, 2013.

(58) Field of Classification Search
USPC .................................................. 705/335
See application file for complete search history.

(56) References Cited

U.S. PATENT DOCUMENTS

| | | | |
|---|---|---|---|
| 5,265,006 A | 11/1993 | Asthana et al. | |
| 5,648,770 A | 7/1997 | Ross | |
| 5,835,376 A | 11/1998 | Smith et al. | |
| 5,835,580 A | 11/1998 | Fraser | |
| 5,880,958 A | 3/1999 | Helms et al. | |
| 6,035,289 A | 3/2000 | Chou et al. | |
| 6,219,653 B1 * | 4/2001 | O'Neill | G06Q 30/0283 |
| | | | 705/29 |
| 6,879,962 B1 | 4/2005 | Smith et al. | |
| 7,068,149 B2 | 6/2006 | Lee et al. | |
| 7,119,716 B2 | 10/2006 | Horstemeyer | |
| 7,222,081 B1 | 5/2007 | Sone | |
| 7,343,300 B2 * | 3/2008 | Podgurny | G06Q 30/0601 |
| | | | 705/26.1 |
| 7,353,181 B2 | 4/2008 | Nel | |
| 8,560,461 B1 * | 10/2013 | Tian | G06Q 10/087 |
| | | | 705/332 |
| 8,564,459 B2 | 10/2013 | Horstemeyer | |
| 2002/0095308 A1 * | 7/2002 | Pragelas | G06Q 10/08 |
| | | | 705/75 |
| 2005/0060244 A1 * | 3/2005 | Goolkasian | G06Q 30/08 |
| | | | 705/28 |
| 2005/0091089 A1 * | 4/2005 | Bjerre | G06Q 10/0834 |
| | | | 705/5 |
| 2006/0241822 A1 | 10/2006 | Yadappanavar et al. | |
| 2009/0037245 A1 | 2/2009 | Gabrielson | |
| 2013/0179362 A1 * | 7/2013 | Rhyan | G06Q 10/08345 |
| | | | 705/335 |
| 2014/0052593 A1 * | 2/2014 | Pool | G06Q 30/0635 |
| | | | 705/34 |
| 2014/0180954 A1 | 6/2014 | Robert et al. | |
| 2014/0180958 A1 * | 6/2014 | Arunapuram | G06Q 10/08355 |
| | | | 705/338 |
| 2014/0201020 A1 | 7/2014 | Horowitz et al. | |
| 2014/0250028 A1 | 9/2014 | Motsick | |
| 2015/0026090 A1 * | 1/2015 | Marrale | G06Q 10/08345 |
| | | | 705/335 |
| 2016/0321609 A1 * | 11/2016 | Dube | G06Q 10/08355 |
| 2017/0061376 A1 * | 3/2017 | Wagner | G06Q 10/0838 |

OTHER PUBLICATIONS

Anonymous, Internet article: http://www.archive.org/web/20120417174407/http://www.exfreight.com/how-to-ship.html, (retrieved Mar. 15, 2017).

* cited by examiner

PROCESS OF COMBINING MULTIPLE CARRIERS FOR INTERNATIONAL SHIPPING

PRIORITY CLAIM

The present invention is a continuation-in-part of U.S. patent application Ser. No. 14/309,147 entitled "PROCESS OF COMBINING MULTIPLE CARRIERS FOR INTERNATIONAL SHIPPING" filed Jun. 19, 2014, which claims priority to U.S. Provisional Patent Application No. 61/836,809, entitled "PROCESS OF COMBINING MULTIPLE CARRIERS FOR INTERNATIONAL SHIPPING", filed Jun. 19, 2013, the contents of which is incorporated herein by reference.

FIELD OF THE INVENTION

The invention is directed to the field of international shipping and in particular to a method of selecting multiple independent freight carriers to provide a cohesive international shipping service.

BACKGROUND OF THE INVENTION

International shipping can result in a logistic nightmare. For example, a freight carrier that is able to pick-up an over sized freight item in the United States may not be equipped to ship the freight overseas by air freight when needed. Similarly a freight carrier that is able to pick-up an over sized freight item in the United States may not be equipped to ship the freight overseas by ocean transit when needed. Further, once freight has been shipped overseas a destination carrier is needed to retrieve the freight from an airport or seaport and transport the freight to the final destination.

To further complicate the matter, each carrier has weight and size requirements. A transport truck is not needed for a handheld package. In addition, the ability to coordinate multiple transport companies and obtain the most cost effective shipping route and carrier compounds the problem.

What is needed in the industry is a process that combines multiple carriers together in order to provide one cohesive international service providing the consumer with a door to port rate, as well as a door to door rate.

SUMMARY OF THE INVENTION

Disclosed is a process of online rating for international shipments. The process combines multiple carriers together in order to provide one cohesive international service. The consumer can obtain a door to port rate when employing a pick-up carrier (trucking company) and an airline or ocean carrier, as well as a destination trucking company. The process calculates the closest terminal based on distance mileage and determines which terminal to terminal rate to use for the air or ocean portion as well as providing a pick up rate for that service. The process further estimates the multiple costs from various vendors associated with a shipment and stores these costs through a database to be used at a later date for verification. The process allows for estimating a charge to a customer based on multiple cost factors from various vendors and saving that charge in a database to be invoiced. The process provides a seamless and cost-effective solution for international transportation needs.

It is an objective of the instant invention to teach a process of online rating for international shipments.

Another objective of the invention is to teach a process of combining multiple carriers together in order to provide one cohesive international service.

Still another objective of the invention is to provide a door to port rate when employing a pick-up carrier (trucking company) and an airline or ocean carrier.

Still another objective of the invention is to provide a door to door rate when employing a pick-up carrier (trucking company) and an airline or ocean carrier, and a destination trucking company.

Yet still another objective of the invention is to provide a process of finding the closest terminal based on distance mileage for calculating which terminal to terminal rate to use for the air or ocean portion as well as providing a pick-up rate for that service.

Still another objective of the invention is to provide a process of estimating the multiple costs from various vendors associated with a shipment and saving those costs in a database to be used at a later date for verification.

It is a still further objective of the invention to provide a process of estimating a charge to a customer based on multiple cost factors from various vendors and saving that charge in a database to be invoiced.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

The patent or application contains at least one drawing executed in color. Copies of this patent or patent application publication with color drawings will be provided by the Office upon request and payment of the necessary fee.

FIG. 2 is a screen display for obtaining a rate for a shipment;

FIG. 4 is a screen display confirming the rate;

FIG. 8 is a screen display providing an example of an export declaration page.

FIG. 15 is an alternative screen display similar to FIG. 1 depicting all shipment in transit;

FIG. 17 is an alternative screen display similar to FIG. 3 entering a shipment data for rate;

FIG. 22 is an alternative screen display similar to FIG. 8 providing an example of an export declaration page.

DETAILED DESCRIPTION OF THE INVENTION

The process employs a computer capable of combining multiple carriers for international shipping using a software program accessible on the internet. The program includes a series of steps that allows a customer to follow screen prompts to determine the most efficient and cost effective manner to ship freight internationally.

Figure 1:
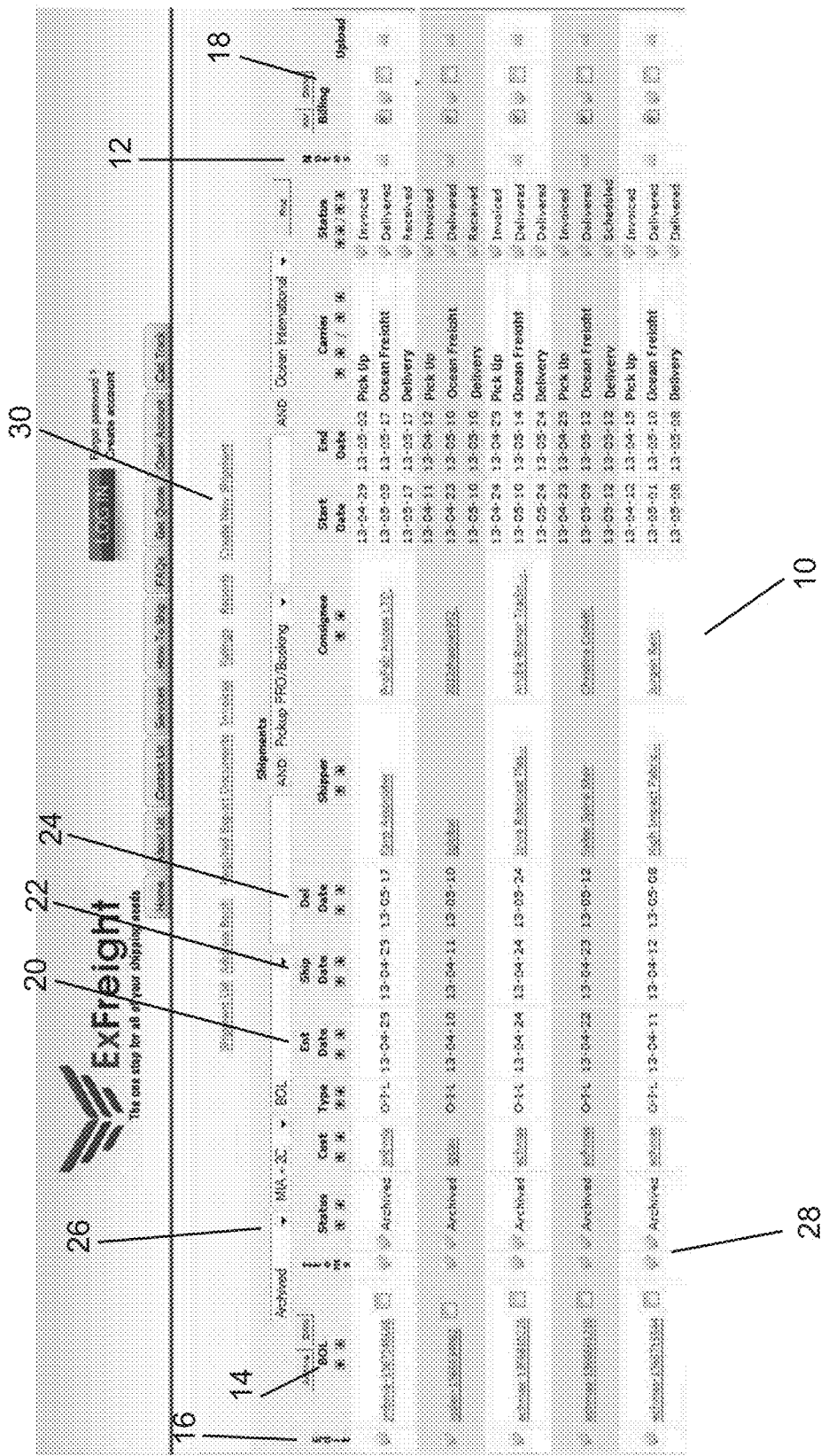
FIG. 1 is a screen display depicting all shipment in transit.
Figure 2:
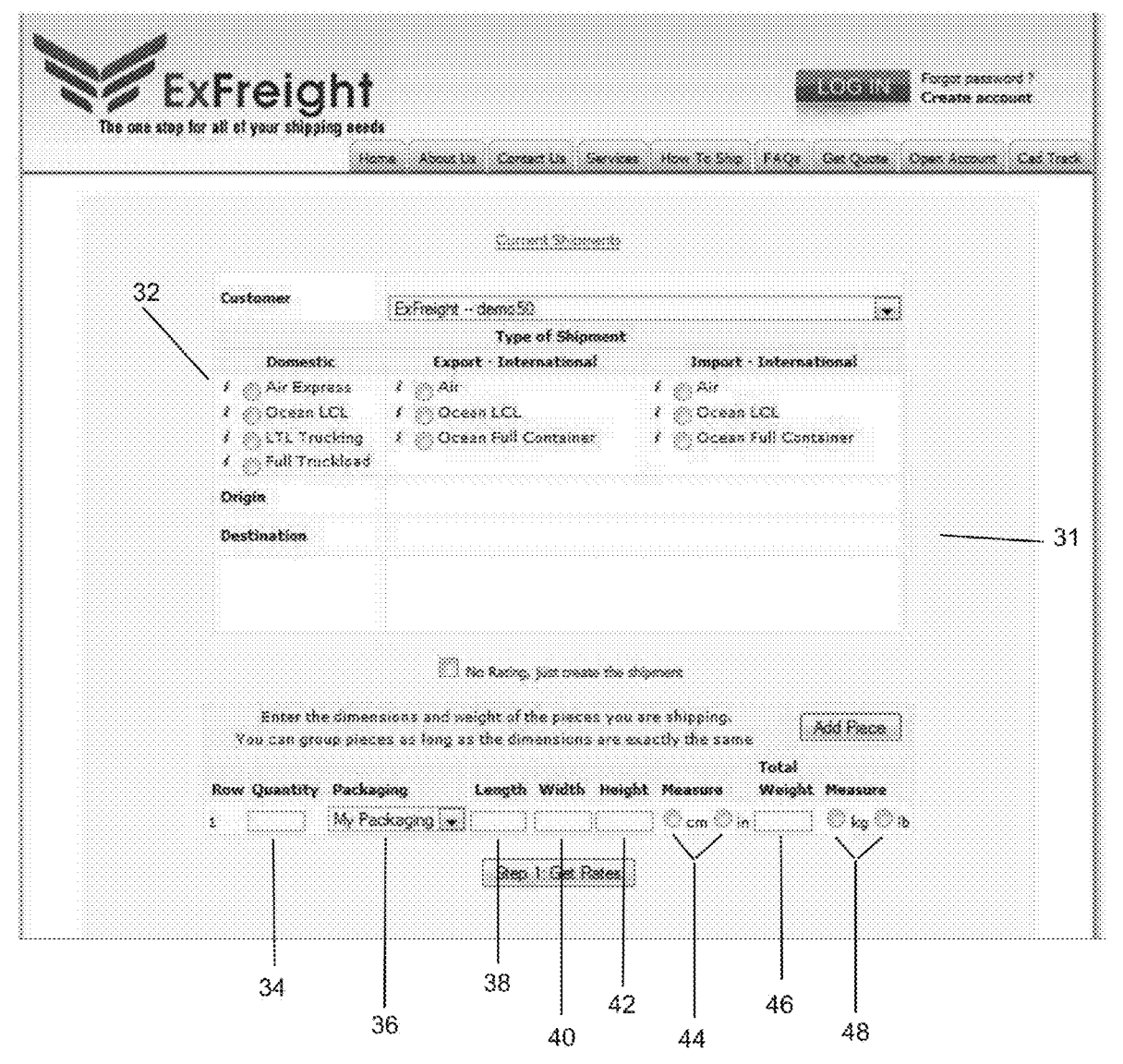
Figure 15:
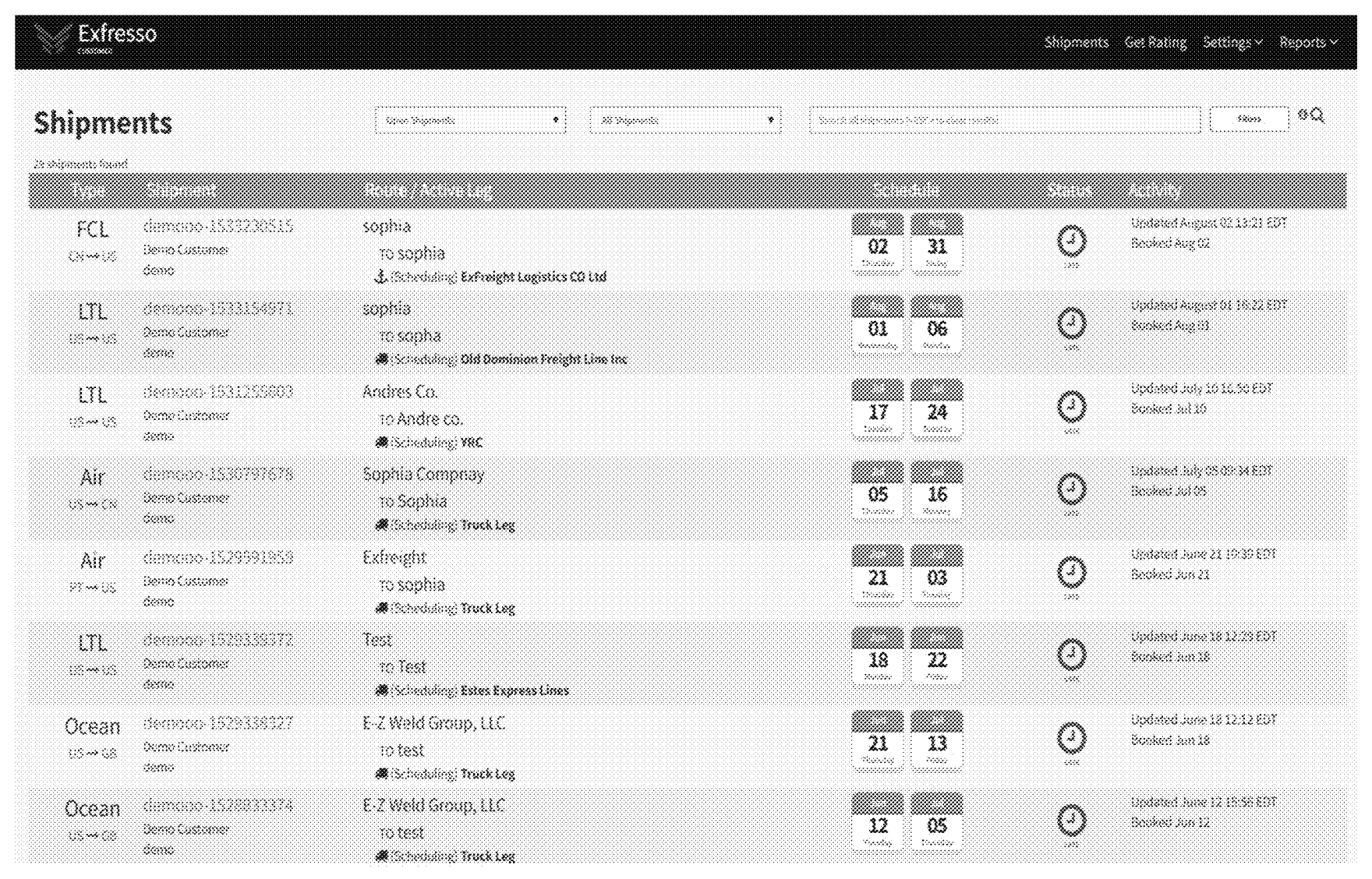
Figure 16:
FIG. 16 is an alternative screen display similar to FIG. 2 for obtaining a rate for a shipment.

Referring to FIGS. 1 & 15, once a customer logs in they are greeted by a shipment in the transit screen 10 that displays all shipments in transit for their account. A Notes icon 12 provides a link to a record of tracking event available for each shipment. A BOL icon 14 is used to retrieve all transport documents and uploaded commercial documents related to the shipment. An EDIT icon 16 accesses the customs export declaration section of the shipment where commercial invoices and packing lists can be uploaded and filled in with customs HS codes and values for customs export filing. A Billing icon 18 provides a breakdown view of all charges incurred for the shipment prior to invoice. When invoiced the invoice icon appears and provides access to a downloadable invoice. There is also a series of dates listed showing the different stages of each shipment i.e. pick-up at origin 20, transit by air/sea 22, delivery at destination 24. All shipments are searchable by entering in a search string in the top search bar 26. Anytime a new tracking event occurs for a shipment its recorded in the notes section for reference, as well as emailed to the customer and all parties listed as notify parties on the shipment booking screen 28. When a customer has a shipment to book they would select the create shipment tab 30 on the previous page which would bring them to the rating page 31 shown in FIGS. 2 and 16. The user can select from a multitude of services 32 for both import and export services into and out of the country. The user will select the mode of transport, AIR, OCEAN LCL, LTL trucking, Full Truckload, where more options specific to that service type will open for the user to enter in for a rate to be generated. The customer enters the quantity 34, packaging 36, length 38, width 40, height 42, size in either centimeters or inches 44, and the total weight 46 in either kilograms or pounds 48.

Figure 3:
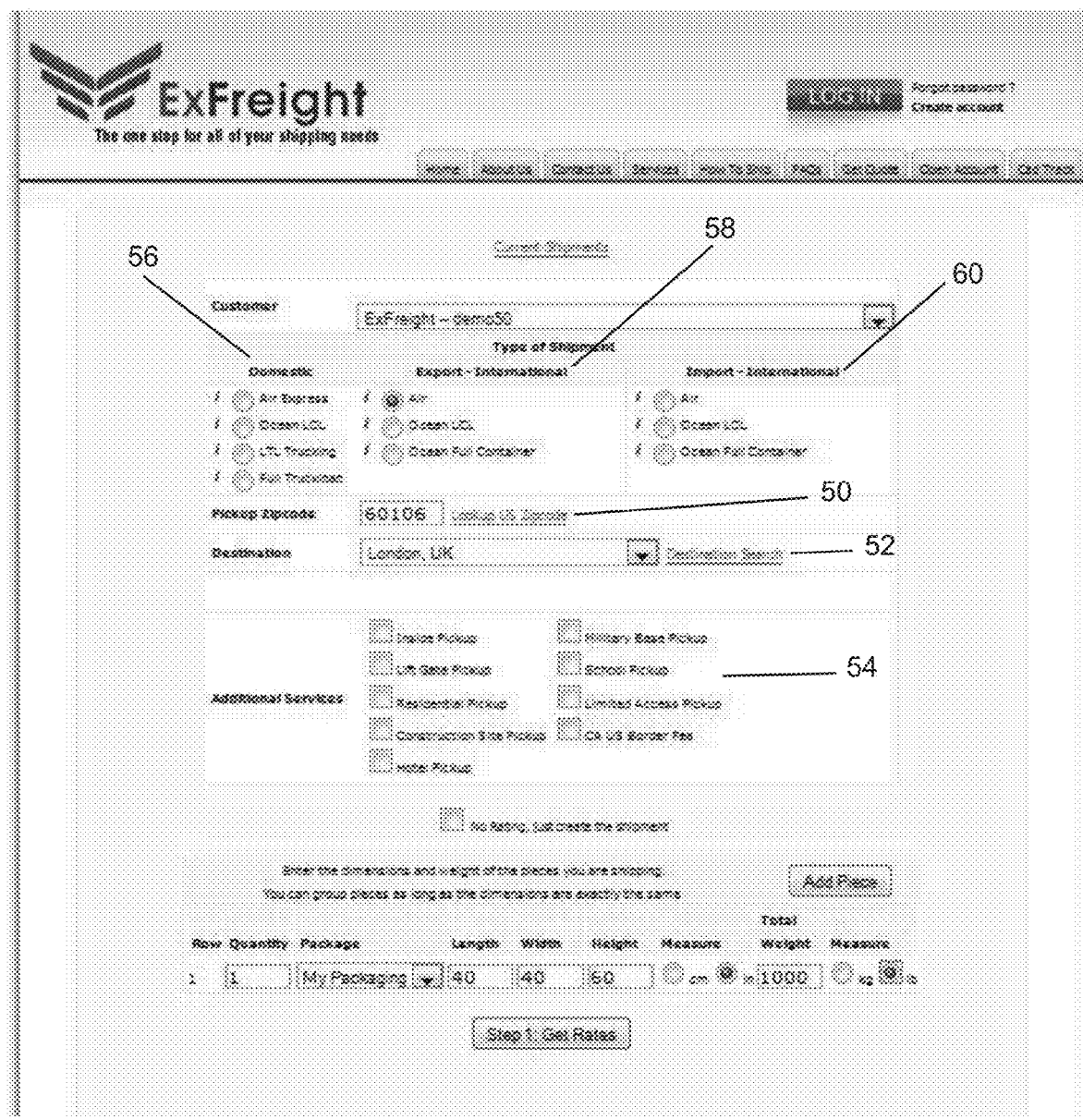
FIG. 3 is a screen display entering a shipment data for rate.
Figure 17:
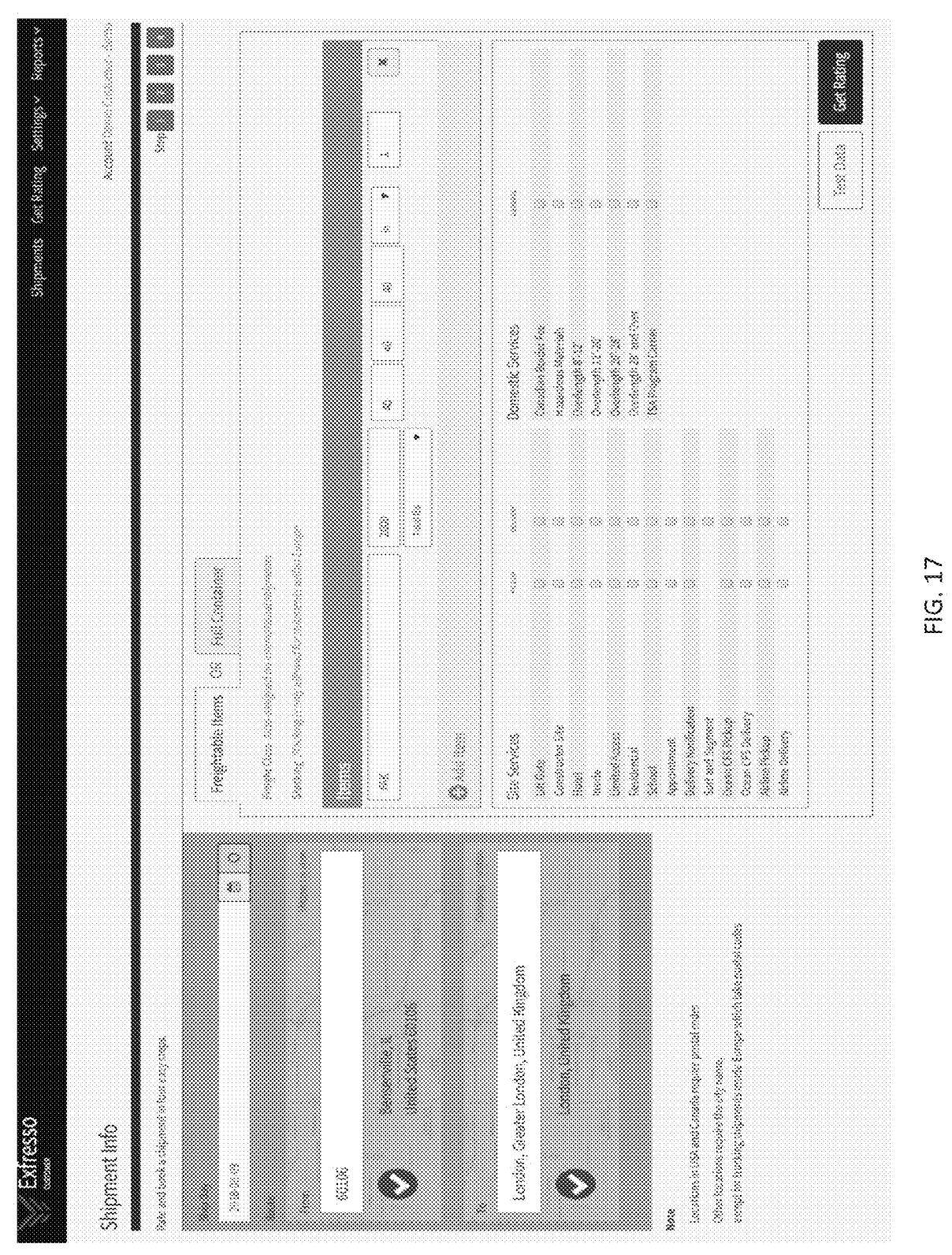

Referring to FIGS. 3 and 17, once the customer selects the service type they will be asked for more details on the shipment. In this particular example the customer enters the pick-up zip code 50, destination 52 and any additional service 54. The questions asked are dependent upon the type of shipment required, either domestic 56, export-international 58 or import-international 60. For instance:

Airfreight Export—Pick up zip code, destination city, pcs, weight, and dimensions of each piece.

Ocean LCL Export—Pick up zip code, destination city, pcs, weight, and dimensions of each piece.

Ocean FCL Export—Pick up zip code, destination city, # of containers, size of container, and weight per container.

Airfreight Import—Origin City, Destination zip, pcs, weight, and dimensions of each piece.

Ocean LCL Import—Origin City, Destination zip, pcs, weight, and dimensions of each piece.

Ocean FCL Import—Origin City, Destination zip, # of containers, size of container, and weight per container.

Once the customer enters in their details the rating engine will check to confirm that the cargo is not too heavy, the rating engine will also check to confirm if the cargo will fit on the aircraft or ocean container. The rating engine will check if the account is a secure shipper or unsecure shipper based on security rules and use the proper tariff and routing options set up in the database accordingly. The rating engine checks the origin zip for exports against all the origin terminals that are stored for AIR and OCEAN rates to the destination selected, and confirm based on mileage distance which terminal is closest to use. The rating engine will then use terminal to terminal Air Freight or Ocean rate as the base freight rate to work with and also check another database for trucking rates from the origin zip to the export terminal and consolidate it with the base freight rate and the destination delivery rates as one consolidated freight rate from origin to destination.

For Imports the rating engine will perform the same process except the computer will use the mileage search on destination terminals in the rate database and destination zip. The rating engine will add a profit margin to the total consolidated rate which is offered to the customer. Each customer would have their own margin set up in the database, which is set up in the Manage Accounts section by the administrator. The rating engine will save all the data from the inquiry and the displayed rates provided in a database for future reference.

Figure 4:
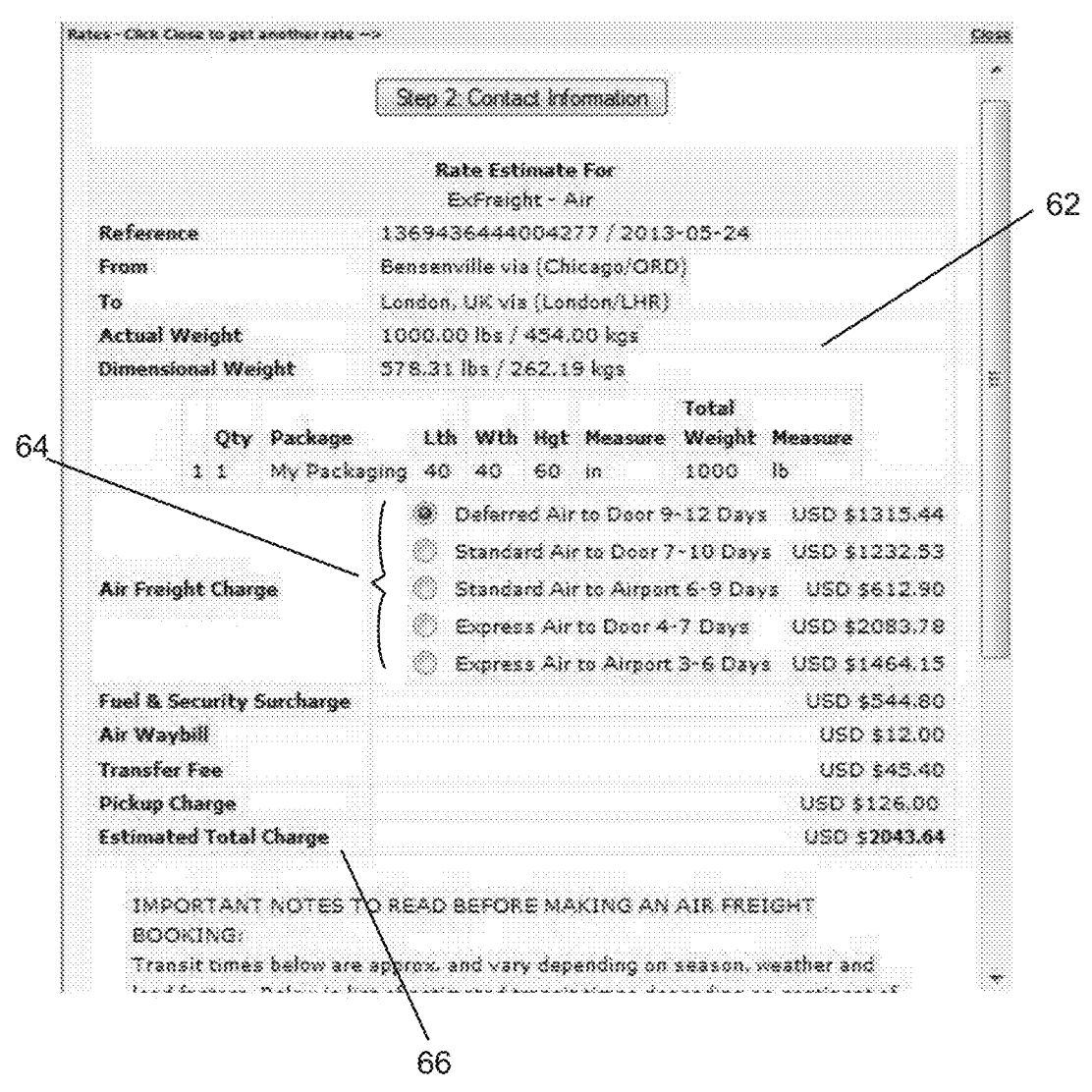
Figure 18:
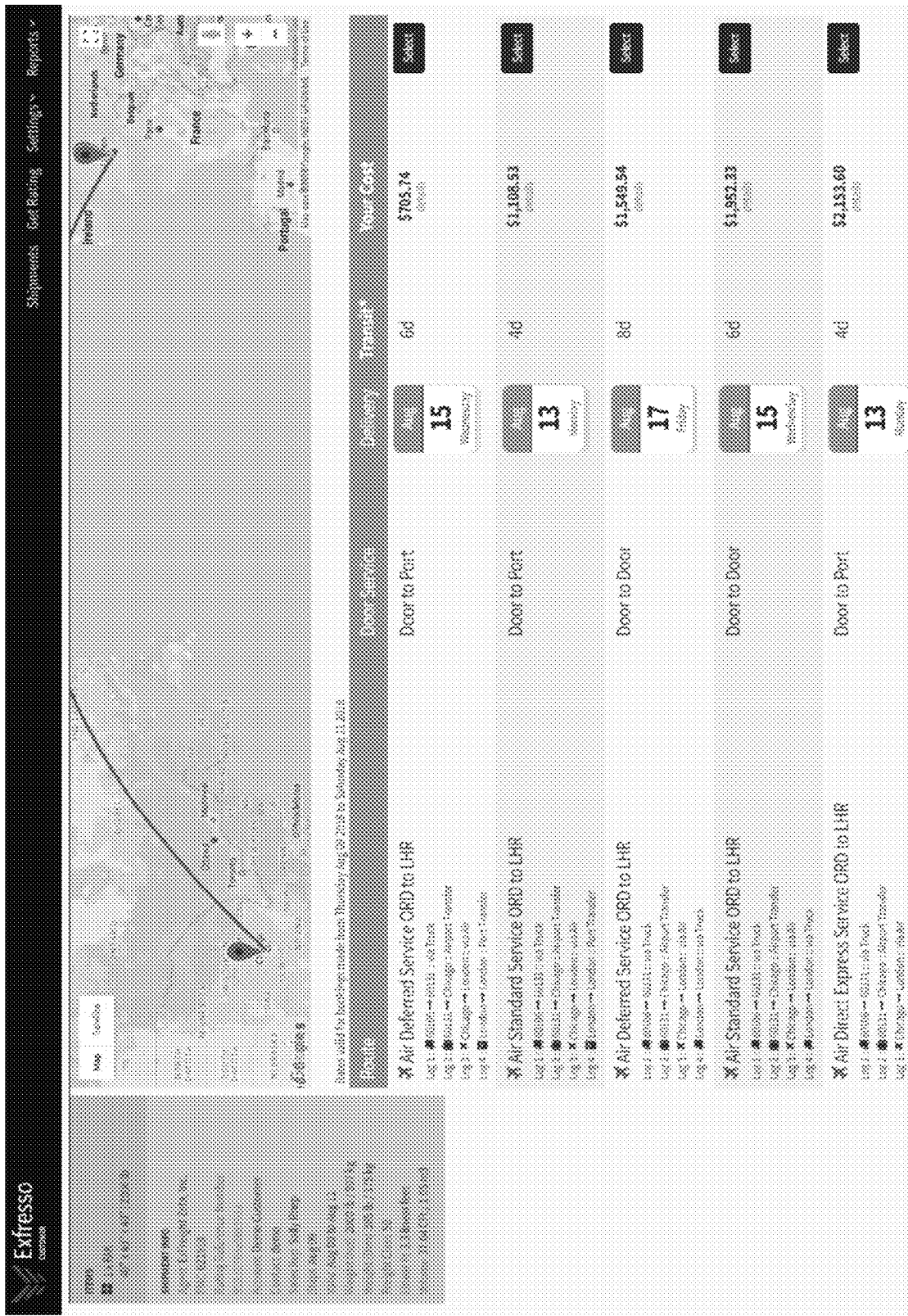
FIG. 18 is an alternative screen display similar to FIG. 4 confirming the rate.

FIGS. 4 and 18 depicts the customer display 62 having all the rates and different service levels with the margin built in. This is how the user selects the service level 64 they want to send the shipment on. Based on the different options a different AIR or OCEAN carrier is selected as well as a rate for destination delivery is added to the rate. When another option is selected the total charge 66 is recalculated at the bottom. When the customer is satisfied with their choice they can select a button to book the shipment. All costs associated with this shipment as well as revenue will then be saved in the database to be applied and used by accounting to verify costs from vendors (carriers) are correct, as well as to invoice the customer.

Figure 5:
FIG. 5 is a screen display for pick-up and delivery address entry.
Figure 6:
FIG. 6 is a screen display for confirmation booking.
Figure 7:
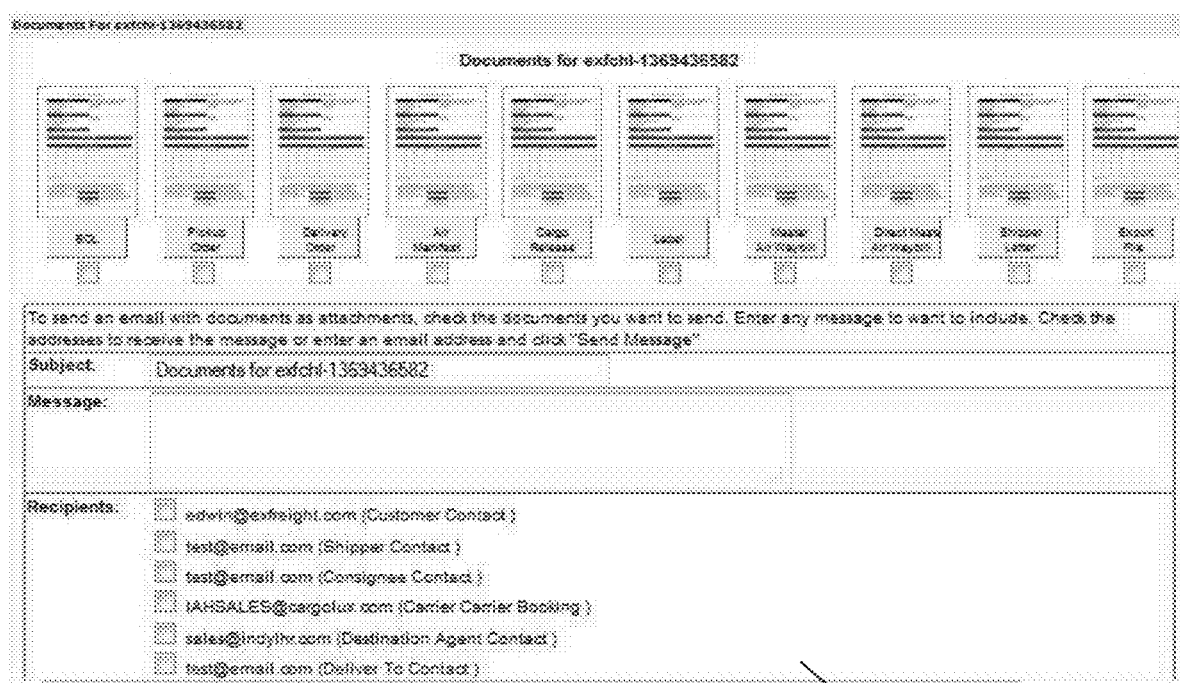
FIG. 7 is a screen display providing an example of a documentation page.
Figure 19:
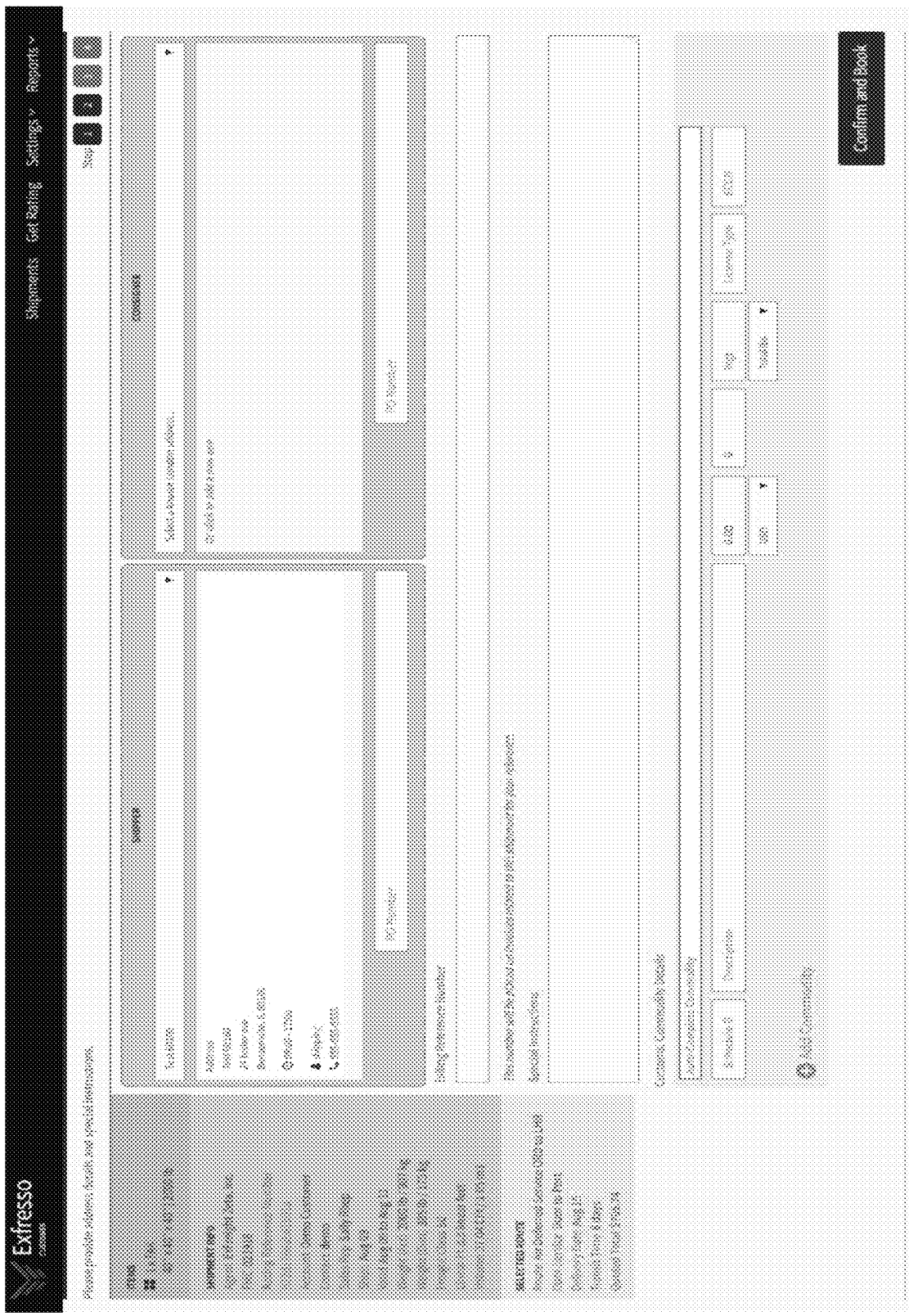
FIG. 19 is an alternative screen display similar to FIG. 5 for pick-up and delivery address entry.
Figure 20:
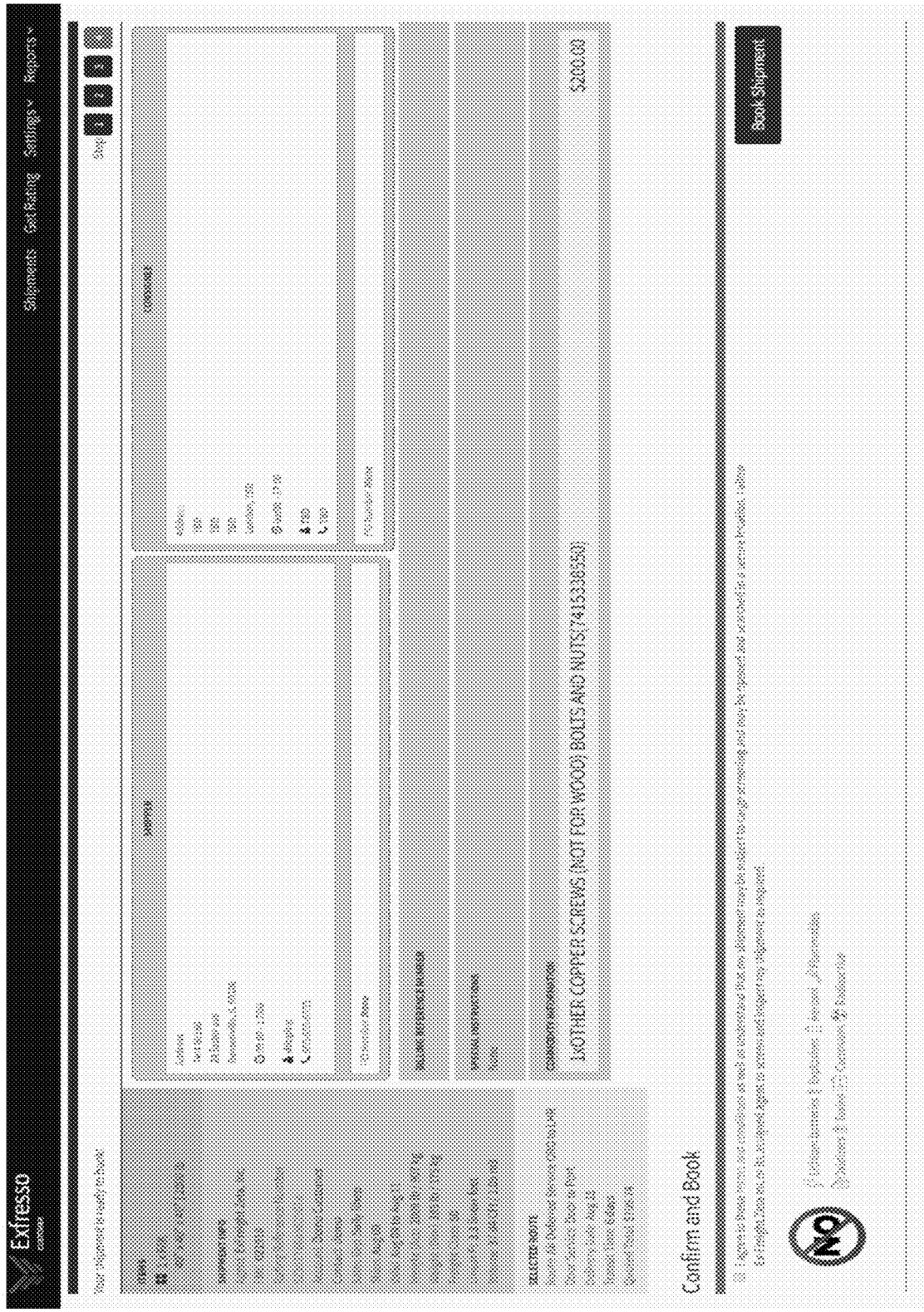
FIG. 20 is an alternative screen display similar to FIG. 6 for confirmation booking.

FIGS. 5 and 19 depict the rate sheet 70 the customer will enter in the pick-up location and delivery location of the shipment. They will also add in the email address of shipper and consignee and select option if tracking history updates should be sent to those email addresses automatically when shipment is en-route. Once shipment is committed the rating engine will send a booking confirmation to the pick-up trucker or origin agent of import, as well as send booking request to the airline or ocean line, and alert the operations staff of the shipment.

Figure 8:
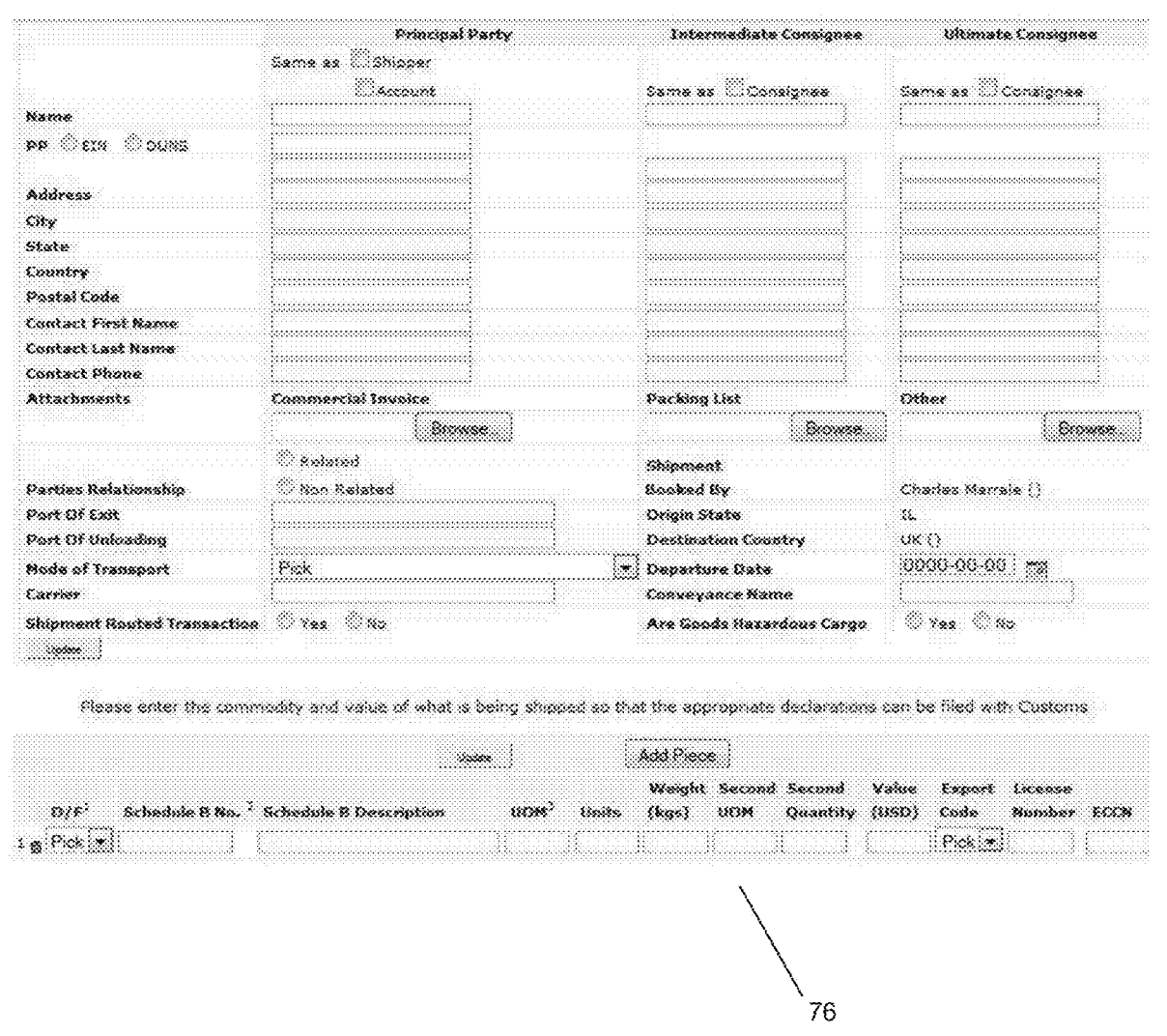

Referring to FIGS. 6-8 and 20, once the customer commits to the shipment 72, a booking confirmation page 74 is provided which gives the customer links to webpages for: 1) all the transport documents required for this shipment—Bill of lading, Labels, etc.; 2) listing of export documentation required for that country; and 3) if shipment is an export— US Customs Export Declaration page. FIG. 8 is a summary sheet that will depict the principal party, intermediate and ultimate consignee. The commodity and value of what is being shipped allows the Rating engine to prepare the appropriate declaration for filing with customs.

Figure 9:
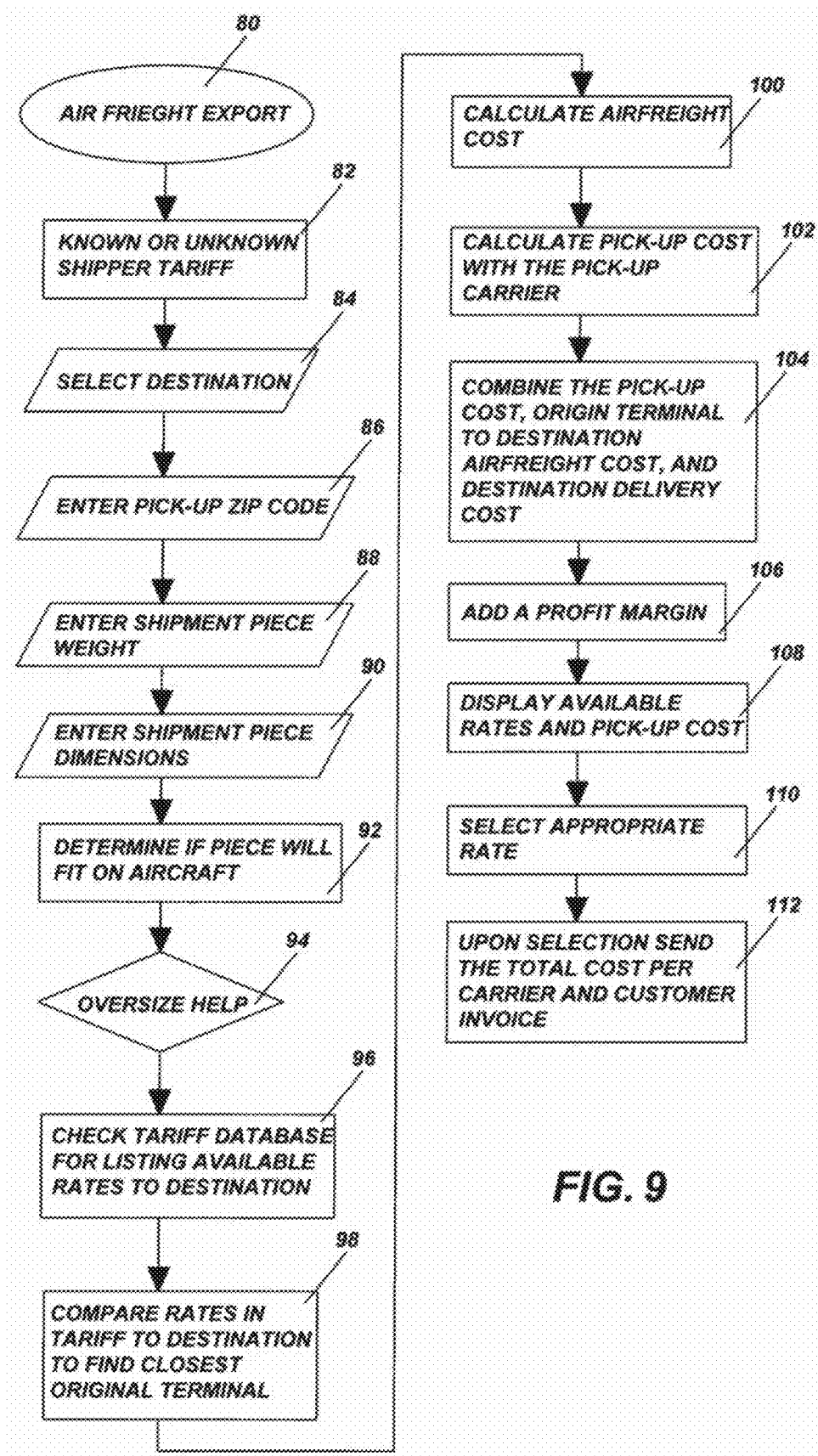
FIG. 9 is a flow schematic for air freight export.
Figure 21:
FIG. 21 is an alternative screen display similar to FIG. 7 providing an example of a documentation page.

Referring to FIGS. 9 and 21, set forth is a flow schematic for air freight export 80, comprising the step of determining if a known or unknown shipper tariff is engaged 82; entering a selected destination 84; selecting a pick-up zip code 86; entering the quantity of the freight to be shipped 88; entering dimensions of the freight 90; determine if the freight will fit into the aircraft used for the air freight export 92; contacting a designated sales department to coordinate shipping of oversize or overweight freight 94; research a tariff database to obtain a listing of rates to said selected destination 96; compare tariff rates to the selected destination to determine the closest original terminal 98; calculate the total cost of the air freight rates from said closest terminal to said destination and destination deliver cost 100; calculate pick-up cost with a pick-up carrier from the original terminal 102; combine the pick-up cost with said original terminal to destination airfreight cost and the destination delivery cost 104; calculate a profit rate 106 to the combined rate; display all available rates including pick-up cost 108; receive selection from a customer as to the rate preferred 110; forwarding the selection received from the customer to a database for engaging the carrier and invoicing of the customer 112.

Figure 10:
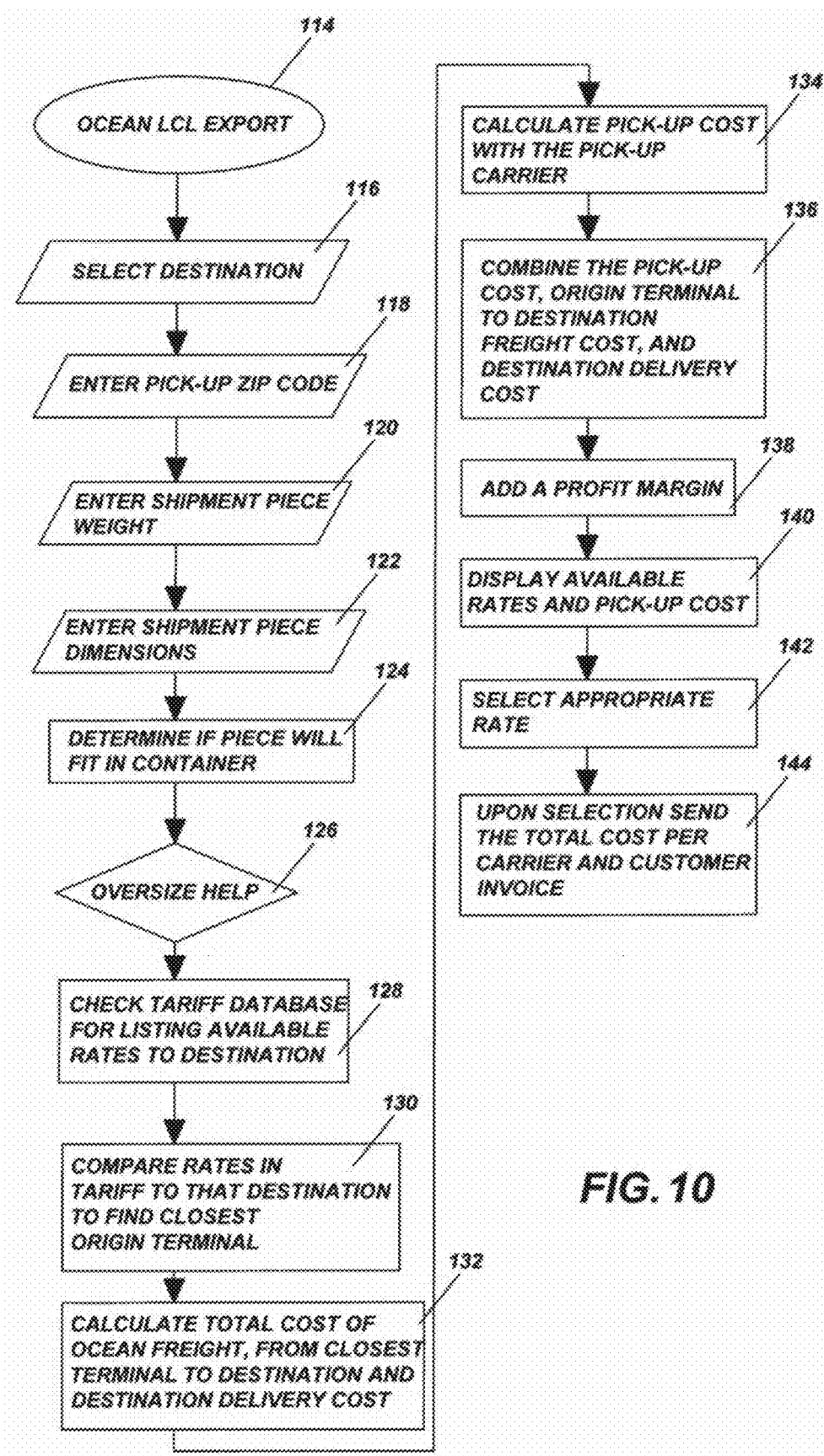
FIG. 10 is a flow schematic for ocean LCL freight export.
Figure 22:
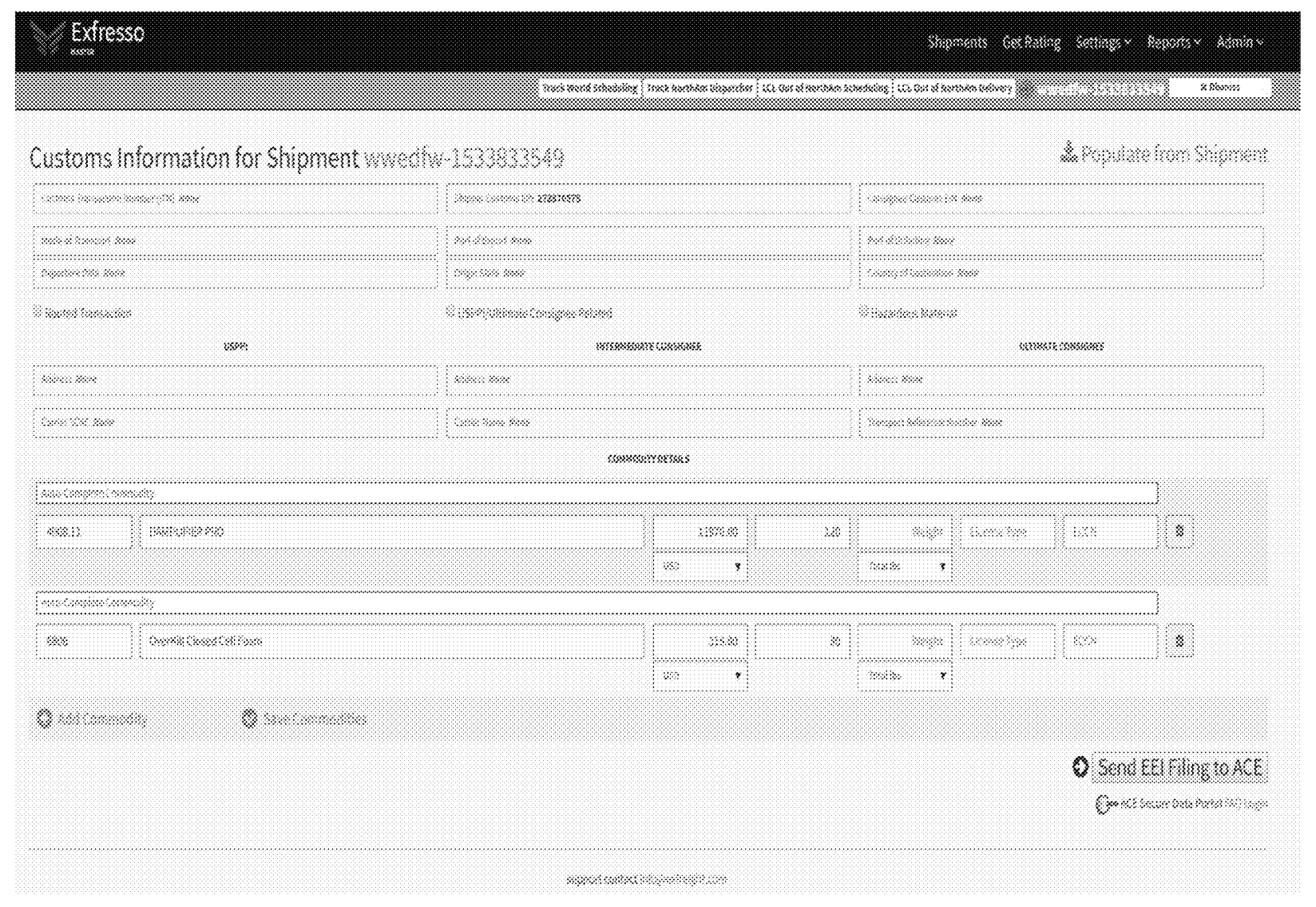

Referring to FIGS. 10 and 22, set forth is a flow schematic for ocean LCL freight export 114, comprising the step of entering a selected destination 116; selecting a pick-up zip code 118; entering the quantity of the freight to be shipped 120; entering dimensions of the freight 122; determine if the freight will fit into a container used for the freight export 124; contacting a designated sales department to coordinate shipping of oversize or overweight freight 126; research a tariff database to obtain a listing of rates to said selected destination 128; compare tariff rates to the selected destination to determine the closest original terminal 130; calculate the total cost of the freight rates from said closest terminal to said destination and destination deliver cost 132; calculate pick-up cost with a pick-up carrier from the original terminal 134; combine the pick-up cost with said original terminal to destination freight cost and the destination delivery cost 136; calculate a profit rate 138 to the combined rate; display all available rates including pick-up cost 140; receive selection from a customer as to the rate preferred 142; forwarding the selection received from the customer to a database for engaging the carrier and invoicing of the customer 144.

Figure 11:
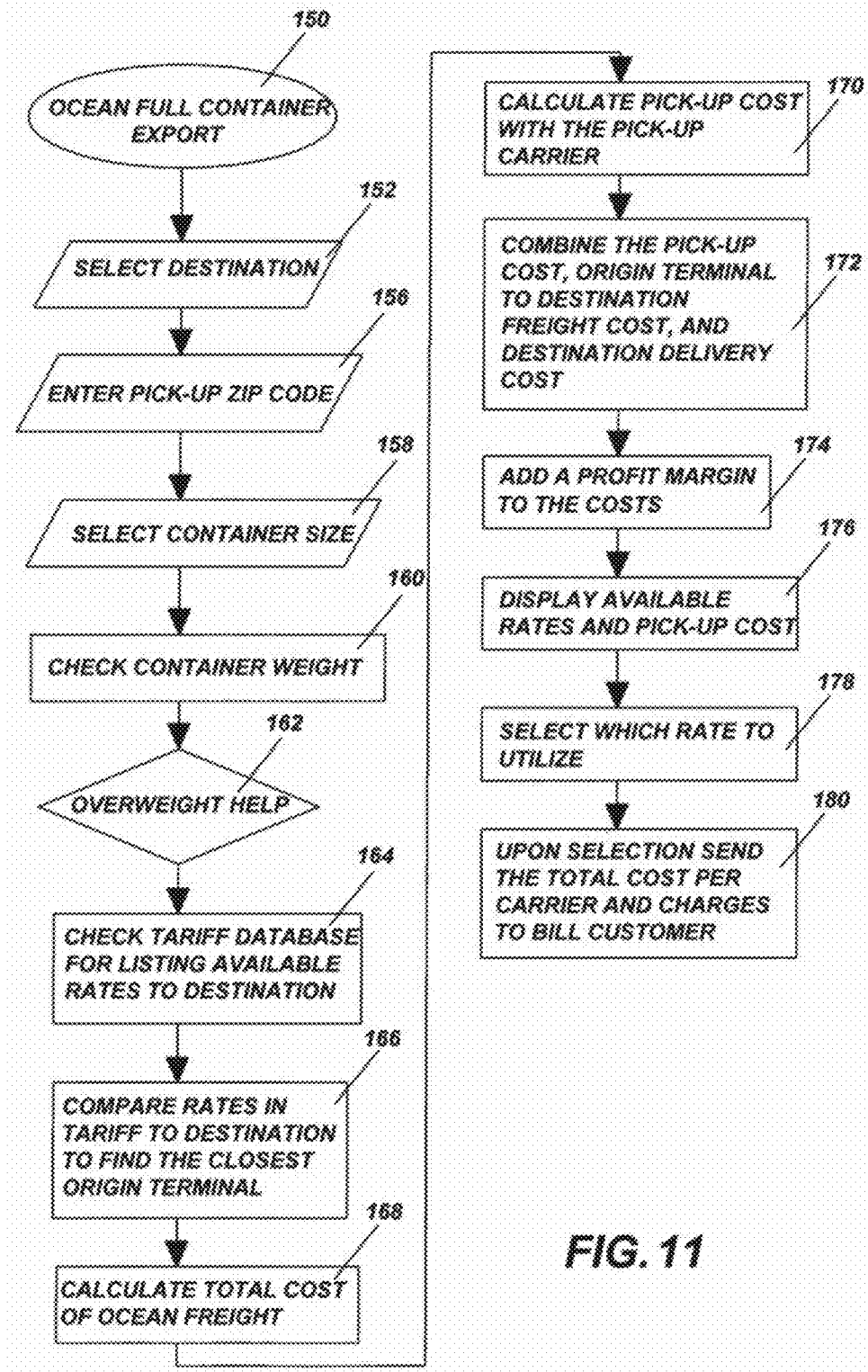
FIG. 11 is a flow schematic for ocean container export.

Referring to FIG. 11, set forth is a flow schematic for ocean full container freight export 150, comprising the step of entering a selected destination 152; selecting a pick-up zip code 156; selecting a container size 158; checking container weight 160; contacting a designated sales department to address overweight freight 162; research a tariff database to obtain a listing of rates to said selected destination 164; compare tariff rates to the selected destination to determine the closest original terminal 166; calculate the total cost of the freight rates from said closest terminal to said destination and destination deliver cost 168; calculate pick-up cost with a pick-up carrier from the original terminal 170; combine the pick-up cost with said original terminal to destination freight cost and the destination delivery cost 172; calculate a profit rate 174 to the combined rate; display all available rates including pick-up cost 176; receive selection from a customer as to the rate preferred 178; forwarding the selection received from the customer to a database for engaging the carrier and invoicing of the customer 180.

Figure 12:
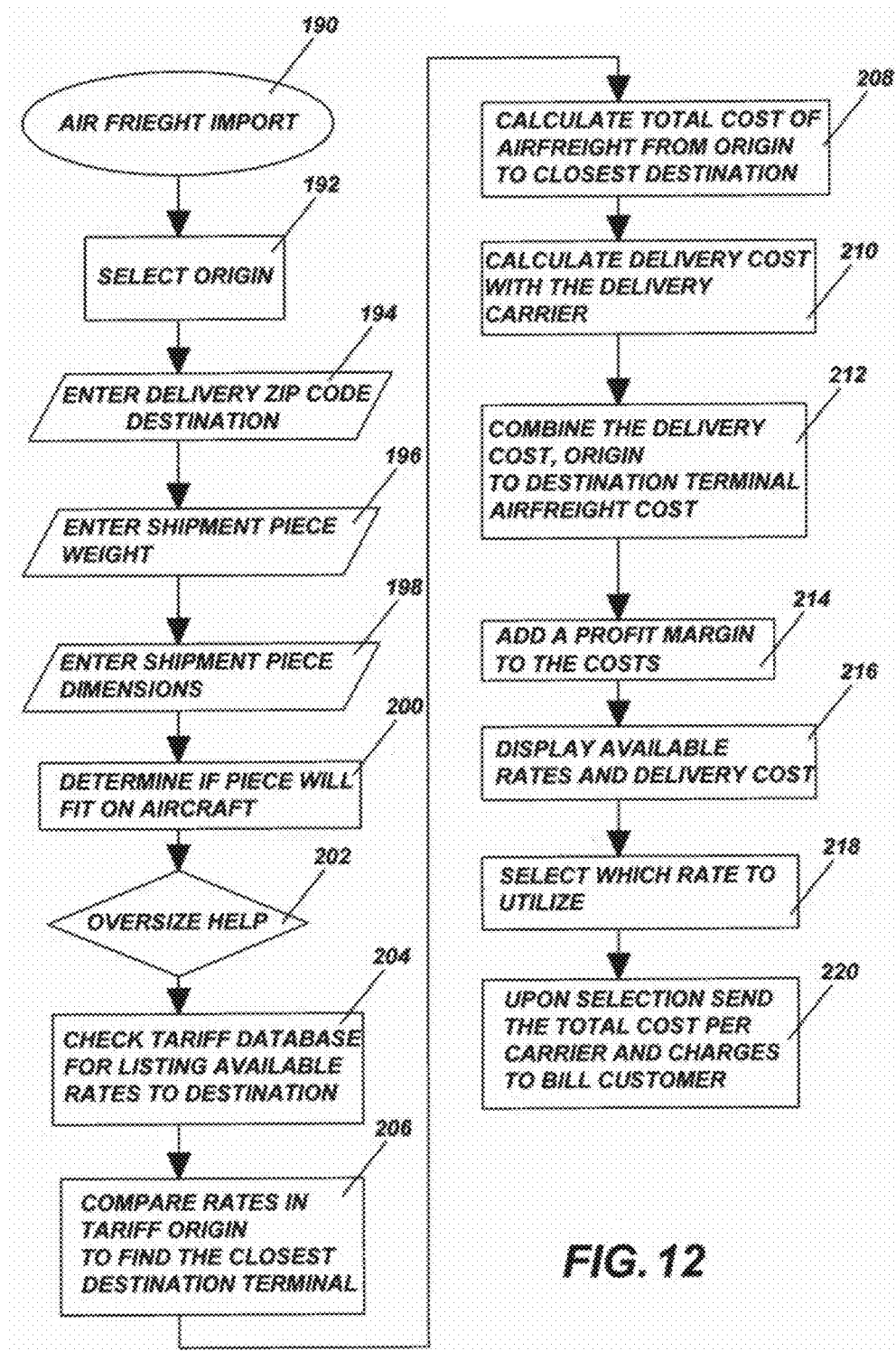
FIG. 12 is a flow schematic for air freight import.

FIG. 12 depicts a method of selecting multiple independent freight carriers to provide a cohesive international air import shipping service 190 comprising the steps of entering a selected origin for freight 192; selecting a delivery zip code destination for the freight 194; entering a quantity of the freight to be shipped 196; entering dimensions of the freight 198; determine if the freight will fit the air craft 200; contacting a designated help department to coordinate shipping of oversize pieces 202; researching a tariff database to obtain a listing of rates from the selected origin to the closest destination terminal 204; calculating the freight total cost from the origin to the closest destination terminal 206; calculate the total cost of the air freight 208; calculate delivery cost with the delivery carrier 210; combining the pick-up cost with the freight total cost and the destination delivery cost 212; incorporating a profit rate 214; displaying available rates and delivery costs 216; receiving a customer selection as to the selected available rates and delivery costs 218; forward the customer selection to a database for engaging the selected carriers and invoicing of the customer 220.

Figure 13:
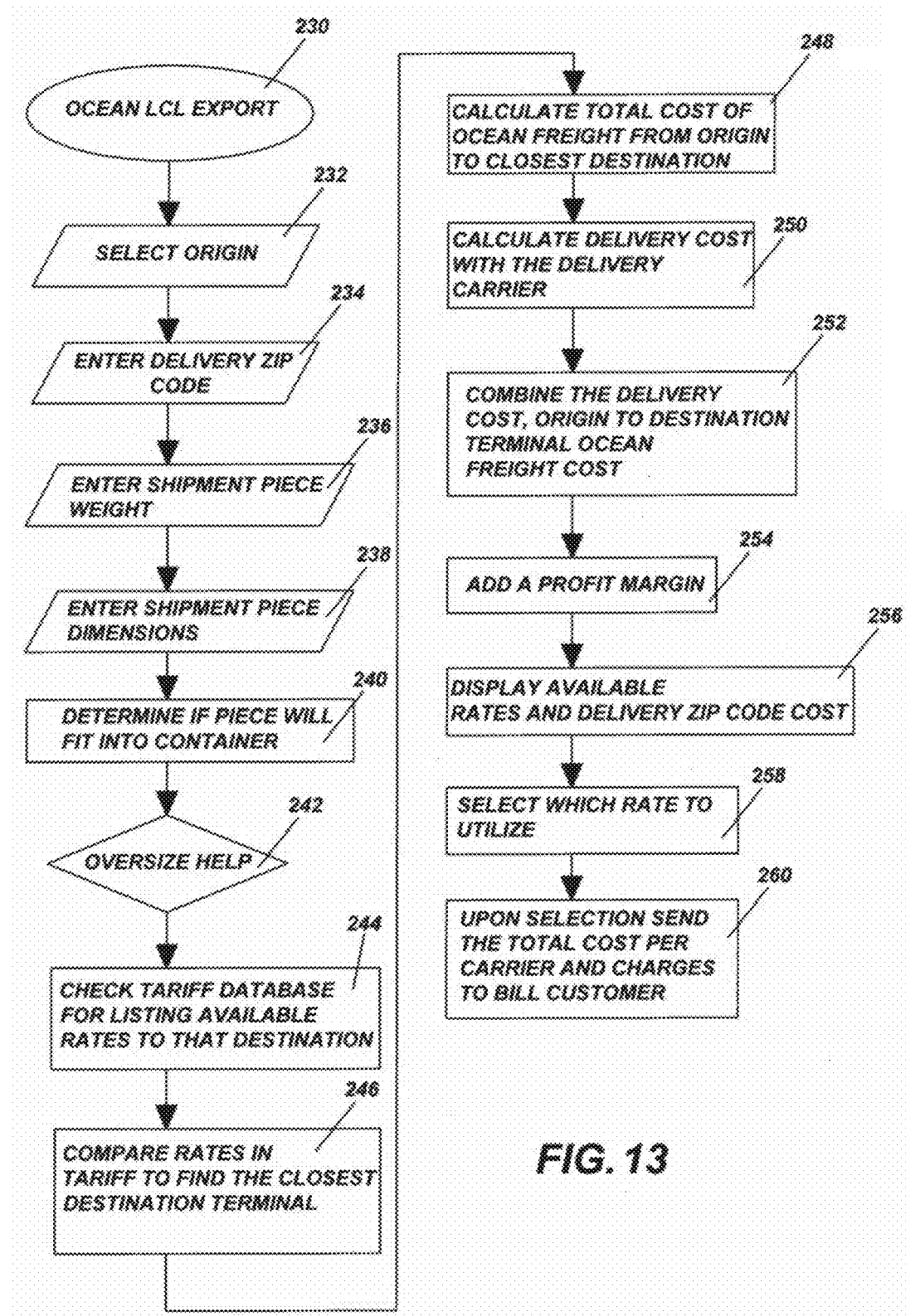
FIG. 13 is a flow schematic for ocean LCL freight import.

FIG. 13 depicts a method of selecting multiple independent freight carriers to provide a cohesive international ocean LCL import shipping service 230 comprising the steps of entering a selected origin for freight 232; selecting a delivery zip code destination for the freight 234; entering a quantity of the freight to be shipped 236; entering dimensions of the freight 238; determine if the freight will fit the ship container 240; contacting a designated help department to coordinate shipping of oversize pieces 242; researching a tariff database to obtain a listing of rates from the selected origin to the closest destination terminal 244; calculating the freight total cost from the origin to the closest destination terminal 246; calculate the pick-up cost between the closest destination terminal and the zip code destination 248; calculate the total cost of the ocean freight 250; calculate delivery cost with the delivery carrier 252; incorporating a profit rate 254; displaying available rates and delivery costs 256; receiving a customer selection as to the selected available rates and delivery costs 258; forward the customer selection to a database for engaging the selected carriers and invoicing of the customer 260.

Figure 14:
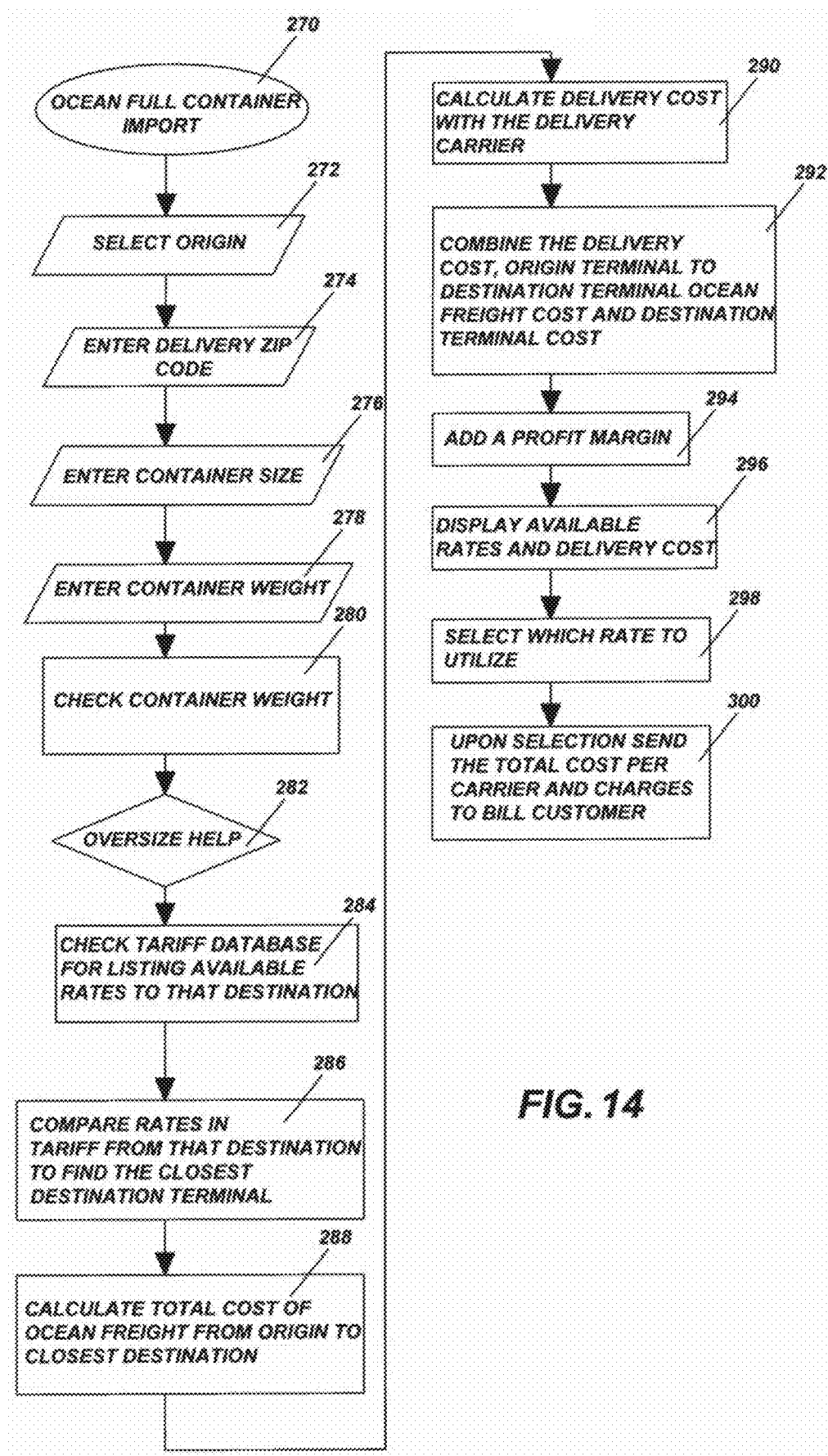
FIG. 14 is a flow schematic for ocean container import.

FIG. 14 depicts a method of selecting multiple independent freight carriers to provide a cohesive international ocean full container import shipping service 270 comprising the steps of entering a selected origin for freight 272; selecting a delivery zip code destination for the freight 274; entering container size 276; entering the container weight 278; checking of the container weight 280; contacting a designated help department for overweight containers 282; researching a tariff database to obtain a listing of rates from the selected origin to the closest destination terminal 284; calculating the ocean freight total cost from the origin to the closest destination terminal 286; calculate the total cost of the ocean freight 288; calculate the pick-up cost between the closest destination terminal and the zip code destination 290; calculate delivery cost with the delivery carrier 292; incorporating a profit rate 294; displaying available rates and delivery costs 296; receiving a customer selection as to the selected available rates and delivery costs 298; forward the customer selection to a database for engaging the selected carriers and invoicing of the customer 300.

The method of selecting multiple independent freight carriers to provide a cohesive international export shipping service includes the steps of electronically querying the carrier for the leg segment rate via API. The system checks which origin port/airport has a service to the destination port/airport and then chooses the closest one to the pick-up location. In addition because the system returns an ocean and air rate at the same time it has the potential to require two pick up rates at the same time. For example, Cleveland to London may result in port to port ocean rate of Cleveland to London and then a port to port air rate of Chicago to London in which we would employ a pick up from Cleveland to Cleveland port for the ocean portion and a pick up from Cleveland to Chicago port for the air rate.

Step 1—Customer enters in the pick-up date, pick up location of the shipment and delivery location of the shipment as well as the Pieces weight and dimensions of the shipment. They will also select if any additional service is required.

Step 2—Based on the pick-up location the system will in sequence figure out the costs and route to move the freight.

A—Check our database to confirm if the customer is established as a known shipper or unknown shipper.

B—If the shipper is a known shipper it will only search the known shipper airline rate database or known shipper airline rate APIs for the airline rates. If it's an unknown shipper it will only search the unknown shipper rate database or unknown shipper airline rate APIs.

C—Check the database to determine destination port that services the destination delivery city entered by user and sorts and calculates the destination delivery costs from costs stored in database or through API call to local carriers for costs. Disqualifies any non applicable delivery rates due to carrier specific size or weight limitations and utilizes the cheapest delivery costs and converts it to the home currency of the customer—example euro to USD.

D—Synchronously searches a database and the carrier's database by API for all ports in pick up country that will have an air rate and ocean rate to the destination port from last step that services the delivery city.

E—Determines which of those ports is the closest to the pick-up location based on a distance calculation (there can be a different one for ocean and Air). For example, pick up in Cleveland OH may result in an ocean port in Cleveland and air rate from Chicago. A calculation is then made of the port to port costs through a synchronous call to ocean and air carriers and search of our internal database for rates. It will then disqualify any non-applicable rate due to carrier specific size or weight limitation and utilizes the cheapest port to port cost per ocean carrier and cheapest port to port airline rate per services level. Then converts those costs to the home currency of the customer.

F—Then synchronously checks a database and multiple pick up carriers for a trucking pick up rate from the pick-up location to the closest port found in previous step utilizing the carriers APIs or our internal rate database (this may be multiple pick up rates per carrier—example 2 queries for pick up from Cleveland to Cleveland ocean warehouse and Cleveland to Chicago airport)

G—Compares the returned rates from the pick-up carriers API and our internal database rates and disqualifies any non applicable pick up rates due to carrier specific size or weight limitations and utilizes the cheapest pick up costs and converts it to the home currency of the customer. This is all accomplished in less than 6 seconds as speed in quoting is necessary in order to secure bookings from retailers who need an instant connection and rate for their customers reviewing purchase options online. Additionally the rating allows for instant update of costs from carriers to accommodate quick changing market conditions where a floating rate depending on time of day or space left on truck, airplane or vessel may determine prices. In some cases carriers don't have rate APIs and we therefore maintain their rates in our database. At each step of rate compilation the carriers transit time to compete the step is recorded alongside the rate so that it can be totaled up and a total overall transit time is provided to the customer Step 3—Based on the step 2 routing and cost processes a set of complete multi carrier rates are now available. Before providing the complete rate to the customer on the screen a final mark up is added to the costs. This is done by finding the customers margin settings in our database and adding a margin to the costs based on the preset markup conditions set in the database per customer per service type. For example, a 15% mark up for airfreight services and 25% mark up for ocean freight services.

Step 4—A rate and routing option is displayed on the screen to the customer to select for booking.

Step 5—Once the customer selects the desired service and transit time they are taken another screen to enter in the pick-up and delivery locations. If they have shipped there before the addresses will already be available to select from a drop down at this stage the customer will also enter in the details of the commodity being shipped and the value of the commodity and schedule B number for the required so an export declaration can be filed prior to export.

Step 6—Once the shipment is booked the system will automatically perform the following functions:

produce an inland and ocean or air bill of lading and shipping labels for the customer to hand to driver at time of pick up;

produce additionally required internal documentation for each carrier to move shipment;

electronically dispatch the pick up to the chosen pick up carrier by email, EDI, or API (depending on carrier settings in database);

electronically by email, EDI, or API request booking with airline or ocean line service selected at time of booking (depending on carrier settings in database);

electronically by email, EDI, or API notify the destination carrier that a shipment was created (depending on carrier settings in database);

create a file in our database with all anticipated costs and charges to invoice customer so accounting and operations personnel can monitor shipment as well as invoice client and audit bills (costs) once received from carriers.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A process for selecting independent freight carriers to provide a cohesive international shipping service; the process comprising the steps of:
    entering, by an application executing on a computer device, information related to freight to be shipped, the information comprising: the quantity of freight, the dimensions of the freight, and the weight of the freight;
    selecting, by use of a rating engine application executing on a computer device, a carrier type from the group consisting of air transport, ocean transport and truck transport, and verifying whether the freight will fit on the transport selected, said rating engine disqualifying freight that is oversized or overweight;
    entering an origin pick-up zip code which selects a terminal closest to the freight to be shipped, and a destination terminal, said rating engine checking said origin pick-up zip code against origin terminals to confirm which terminal is closest through mileage distance;
    electronically querying, by the application executing on the computer device, a tariff database of each freight carrier selected to obtain individual leg segments between terminals;
    modeling routes by combining said rating engine selections and said leg segments;
    comparing, by the application executing on the computer device, tariff rates to the selected destination to determine the closest original terminal to said pick-up zip code;
    calculating, by the application executing on the computer device, the freight total cost from the closest terminal to the selected destination;
    calculating, by the application executing on the computer device, the pick-up cost between a pick-up carrier and the original terminal;
    combining the pick-up cost with the freight total cost and the destination delivery cost;
    incorporating a profit rate;
    displaying available rates and pick-up costs in real time, and providing said displaying route data in graph format;
    receiving a customer selection as to the selected available rates and pick-up costs;
    engaging selected carriers and invoicing of the customer.

2. The process of claim 1, further including the step of determining if the freight is secured or unsecured.

3. The process of claim 2 including the step of determining if the carrier is secured or unsecured.

4. The process of claim 1, further including the step of determining whether a known or unknown shipper tariff is engaged.

5. The process of claim 1, wherein said dimensions and weight of freight are calculated to fit within a container to be transported by a ship.

6. The process of claim 5, wherein weight of freight is calculated for a full container to be transported by the ship.

7. The process of claim 1, further including the step of contacting a designated sales department to coordinate shipping of oversize or overweight freight.

8. The process of claim 1, further including the step of determining one or more transports from a preselected list.

9. The process of claim 1, wherein said rating engine estimates the costs from said transports associated with a shipment and stores the costs in subsequent cost verifications.

10. The process of claim 1, wherein said multiple transports are combined to provide one cohesive door to door service.

11. The process of claim 1, further including the step of locating the closest terminal based on distance mileage which calculates which terminal to terminal rate to use for an air or ocean portion as well as providing a pick-up rate for that service.

12. The process of claim 1, further including a transit screen displaying all shipments in transit for an account.

13. The process of claim 12, wherein said transit screen provide dates for each stage of shipment, including pick-up at origin, transit by air or sea, and delivery at destination.

14. The process of claim 1, wherein said rating engine sends a booking confirmation to a pick-up trucker or origin agent of import, as well as send booking requests to an airline or ocean line and alert operations of the booking.

15. The process of claim 1, wherein said rating engine provides a customer with links to webpages for all the transport documents required for this shipment, listing of export documentation required for a country, and Customs Export Declaration page for international shipments.

16. The process of claim 15, wherein said transport documents include a Bill of Lading.

* * * * *